United States Patent
Filner et al.

(10) Patent No.: US 10,291,737 B2
(45) Date of Patent: May 14, 2019

(54) IDENTIFYING AND CACHING CONTENT FOR OFFLINE USE

(71) Applicant: Facebook, Inc., Menlo Park, CA (US)

(72) Inventors: Aaron Samuel Filner, San Francisco, CA (US); Devin Naquin, San Francisco, CA (US); Joshua Li, Mountain View, CA (US); Katherine L. Swanson, Palo Alto, CA (US); Colin Cameron Brennan Campbell, San Francisco, CA (US); Gregory John Moeck, San Bruno, CA (US)

(73) Assignee: Facebook, Inc., Menlo Park, CA (US)

( * ) Notice: Subject to any disclaimer, the term of this patent is extended or adjusted under 35 U.S.C. 154(b) by 484 days.

(21) Appl. No.: 14/455,807

(22) Filed: Aug. 8, 2014

(65) Prior Publication Data
US 2016/0044127 A1 Feb. 11, 2016

(51) Int. Cl.
*H04L 29/08* (2006.01)
(52) U.S. Cl.
CPC ...... *H04L 67/2847* (2013.01); *H04L 67/10* (2013.01); *H04L 67/22* (2013.01)
(58) Field of Classification Search
CPC ...... H04L 67/2847; H04L 67/10; H04L 67/22
See application file for complete search history.

(56) References Cited

U.S. PATENT DOCUMENTS

| | | | |
|---|---|---|---|
| 9,379,933 B1* | 6/2016 | Bishop | H04L 29/06476 |
| 9,414,222 B1* | 8/2016 | Dixon | H04L 67/00 |
| 9,448,961 B1* | 9/2016 | Cohen | G06F 15/16 |
| 2009/0168795 A1* | 7/2009 | Segel | H04L 67/104 |
| | | | 370/429 |
| 2009/0204481 A1* | 8/2009 | Navar | G06Q 30/02 |
| | | | 725/14 |
| 2014/0046955 A1* | 2/2014 | Dollard | G06Q 30/0251 |
| | | | 707/748 |
| 2014/0095943 A1* | 4/2014 | Kohlenberg | H04W 4/029 |
| | | | 714/47.3 |
| 2018/0253189 A1* | 9/2018 | Jain | G06F 3/0481 |

* cited by examiner

*Primary Examiner* — Viet D Vu
(74) *Attorney, Agent, or Firm* — Baker Botts L.L.P.

(57) ABSTRACT

In one embodiment, a method includes identifying candidate content associated with a user of a computing device, selecting, from the candidate content, cache content to be stored in cache storage of the computing device for access by the user when the computing device does not have network connectivity, and storing the cache content in the cache storage of the computing device. The cache content may be based on information associated with a user node that represents the user in a social graph. The cache content may include entities liked by the user, friends of the user, and/or entities of interest to the user. The cache content includes web pages accessed by the user and/or web pages referenced by content created by the user. The cache content may include information related to past, current, and/or predicted actions of the user, such as social network posts, travel itineraries, and geographic locations.

18 Claims, 5 Drawing Sheets

IDENTIFYING AND CACHING CONTENT FOR OFFLINE USE

TECHNICAL FIELD

This disclosure generally relates to caching electronic content.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, content, such as social graph data related to a user, may be downloaded onto a mobile computing device and stored in a cache on the device for use at subsequent times when the device does not have access to a communication network. This cache content may be provided to a user for use in creating additional content, such as posts in a social network. The downloading and caching of content may be done before or while the user travels to a different geographic location, so that the cached content is available when network communication is unavailable. The content that is likely to be accessed is identified by selecting the most relevant content items from a set of candidate content items that are accessible to or related to the user. The candidate content items may include the user's interests, such as movies and television shows, geographic locations or places visited by the user, information about the user's friends, and other information related to the user in the social network. The candidate content items that are most relevant to the user are stored in cache storage on the mobile. The user may subsequently access the stored content items to perform tasks such as composing posts, emails, or other content, during times that the mobile device does not have access to a communication network.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
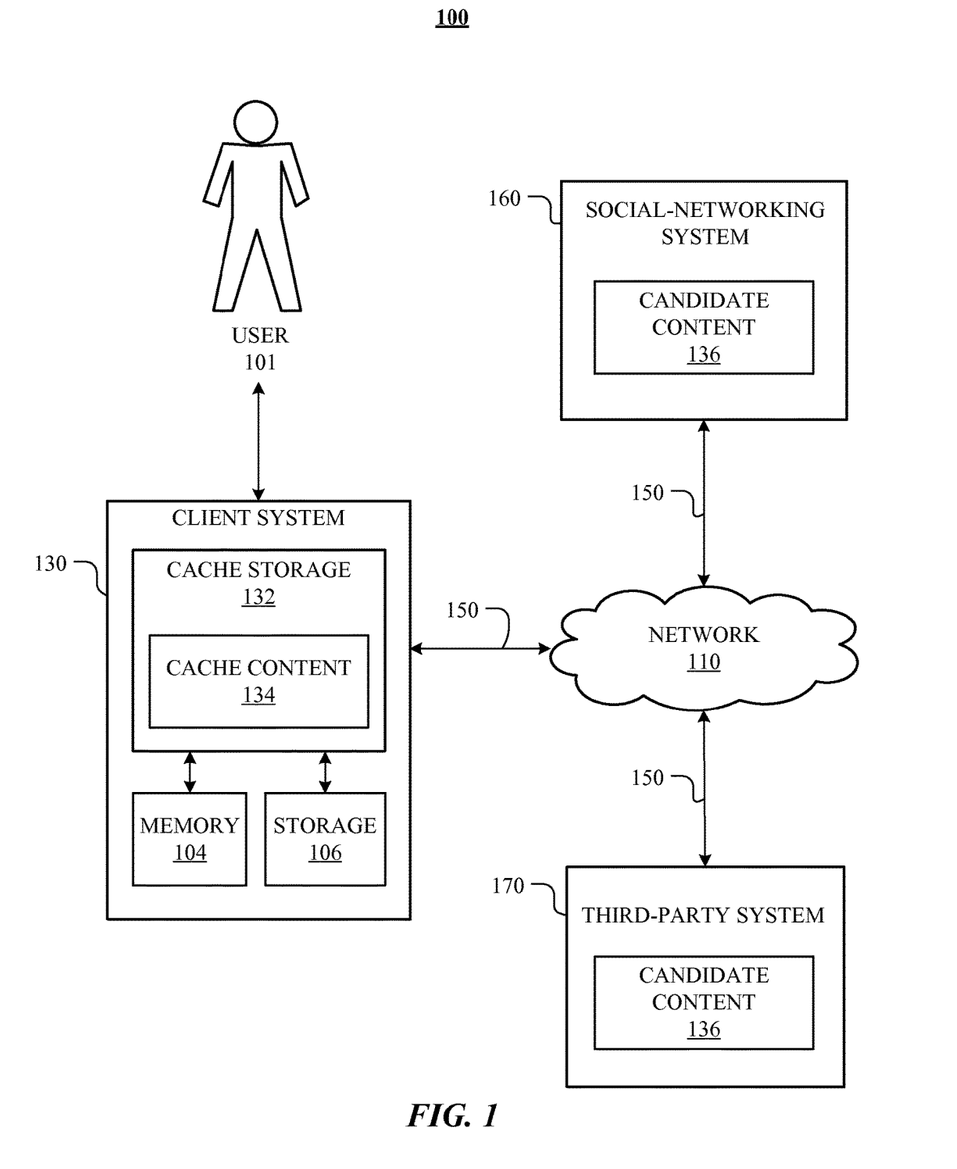
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system that can host a web server or other type of server that provides media content. Third-party system 170 may generate, store, receive, and send media content, such as, for example, web pages, text, audio, video, images, and/or other types of media content. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
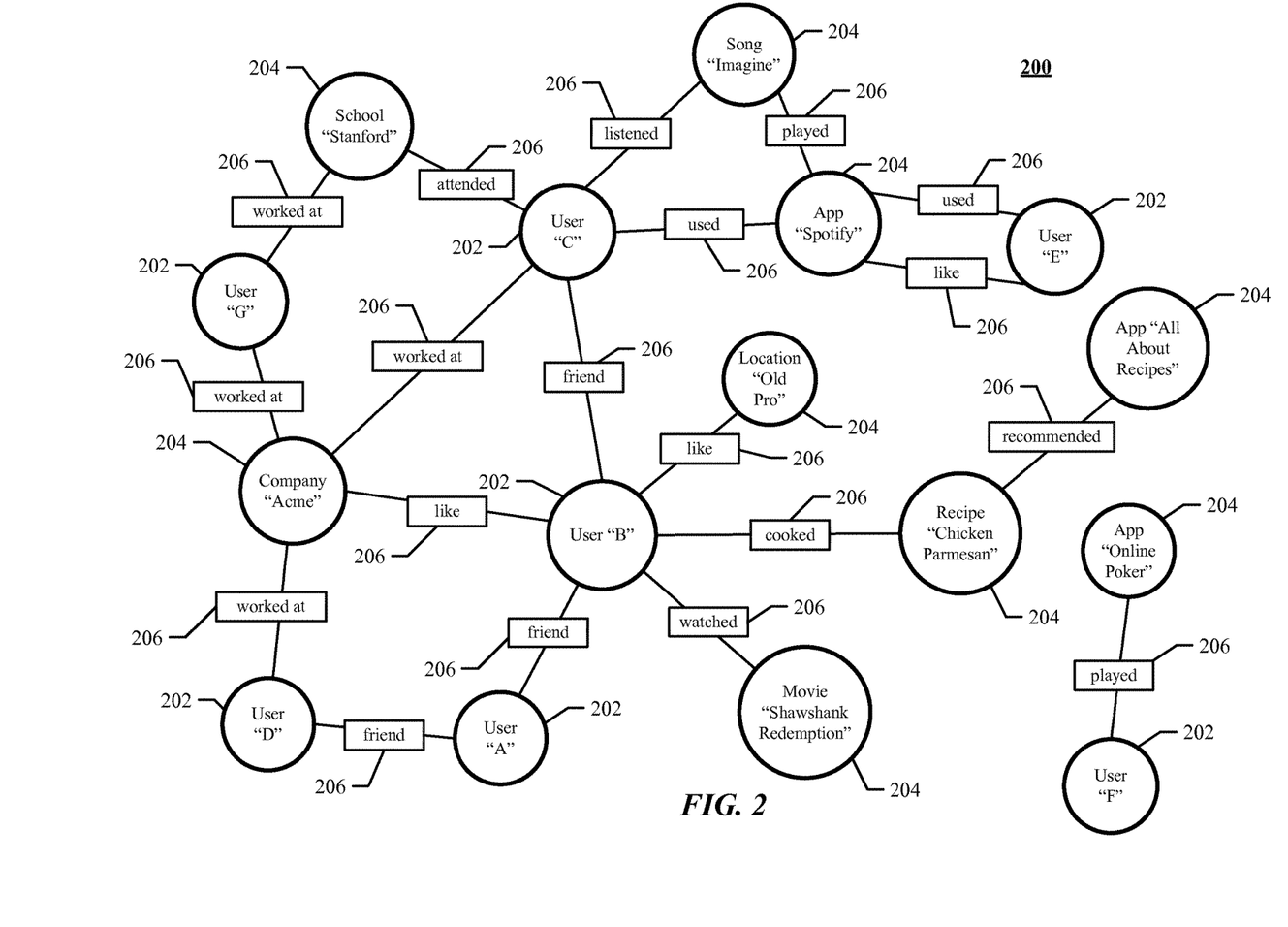
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

A client system 130, such as a notebook computer, mobile telephone, or other computing device accesses other computing devices, such as a social-networking system 160, third-party system 179, and the like, via links 150 to a communication network 110. Many features of the client system 130, such as social-networking applications, web-browsing applications, mapping applications, location databases, and other applications that access remote data involve sending requests to and receiving the data from the social networking system 160 and/or the third-party system 170 via the network 110. If the client system 130 becomes disconnected from the network 110, or communication via the network 110 is otherwise disrupted, these features and/or applications are unable to send and receive data to and from other systems, and are likely to be unusable until communication is restored. Such disconnections can occur, for example, if the client system 130 is a mobile device that accesses the network 150 via a wireless link 150, and the wireless signals are blocked or otherwise undetectable by the client system 130 and/or the systems 160, 170. For example, when a user 101 is traveling and arrives at an underground subway train station in New York City, the user's mobile device may lose connectivity with the network 110 because wireless network signals from base stations do not reach the client system 130 while it is in the underground station. During the time that the client system 130 is disconnected from the network 110, the features and applications of the client system 130 that access other systems via the network 110 are unable to communicate with the social-networking system 160 and other network services such as the third-party system 170, which may include geographical maps services, location databases, web sites, and the like. The user 101 is therefore unable to access these network-based services until communication is restored, which may occur when network connectivity via the link 150 to the network 110 is restored. This loss of service can be a substantial inconvenience to the user 101. For example, while in the underground station, the user may wish to compose a social-network post or email message based on content stored on the social-networking system 160, but is unable to access the content because the user's client system 130 does not have network connectivity in the underground station.

In particular embodiments, information such as content of various forms, e.g., text, audio, video, or other type of media, may be made available to the user 101 on the client system 130 for use when the client system 130 does not have network connectivity. When the client system 130 does not have network connectivity, the system 130 is said to be "offline." A system 130 that does have network connectivity is said to be "online." Content may be made available for offline use by storing the content in cache storage 132 of the client system 130. The cache storage 132 may include portions of a memory 104 and/or a storage 106 of the client system 130. The stored content is referred to herein as cached content 134, and may be retrieved by applications executing on the client system 130 from the cache storage 132, instead of from the social-networking system 160 and/or third-party system 170. The cache content 134 may be stored in the memory 104, the storage 106, or a combination of both. The use of the memory 104 and/or storage 106 to store content for potential offline use is referred to herein as "caching" of the content. Although this disclosure describes storing particular content in particular cache storage in a particular manner, this disclosure contemplates storing any content in suitable storage in any suitable manner.

In particular embodiments, the cache content 134 enables the user 101 to perform tasks while the client system 130 is offline that would ordinarily involve network communication, such as gathering information about nearby locations, events, interests, finding directions, and reading or composing social-network posts or messages based on such information. Since the content is stored for potential later retrieval, e.g., when the user requests the content while the client system 130 is offline, the stored content may be indexed, made searchable, or otherwise structured to enable efficient retrieval of specific items of stored content. Although this disclosure describes providing particular content in response to a user request in a particular manner, this disclosure contemplates providing any suitable content in any suitable manner.

In particular embodiments, the cache content 134 may be indexed to facilitate subsequent retrieval of specific items of the cache content 134. The index may map identifiers for content, such as names, keywords, numeric identifiers, and the like, to items of cache content 134. The index may be generated or updated when each cache content item is stored in the cache storage 132 by generating one or more index entries. The index entries may associate the identifier of the cache content item and/or one or more keywords of the cache content item with the storage location in the cache storage at which the cache content item is stored. Subsequently, a request for content may include the identifier or search keywords associated with the desired content. The storage location of the desired cache content item in the cache storage 132 may be determined by identifying an index entry in the index that associates the identifier and/or keywords from the request with the corresponding cache content item. The index entry may include the storage location at which the desired content item is stored, and the storage location may be used to retrieve the content item. Keywords may be associated with the cached content 134 when the content 134 is stored in the cache storage 132 or at a subsequent time, so that the index maps the keywords to corresponding items of the cache content 134. The keywords and content types may both be used in the same index, e.g., by storing both keywords and content types in index entries.

In particular embodiments, when friends are stored in the cache content 134, the friends that are stored may include one or more friends of the user who have corresponding friend coefficients greater than a threshold value. The friend coefficients are based on closeness of the friends to the user in the social graph. The threshold value may be a number of friends, e.g., 5 or 10, so that information related to the user's 5 or 10 closest friends is stored in the cache storage 132. Although this disclosure describes storing, indexing and retrieving particular cache content in a particular manner, this disclosure contemplates storing, indexing, and retrieving any suitable cache content in any suitable manner.

In particular embodiments, the cache content 134 may include content items retrieved from data sources such the social-networking system 160, e.g., nodes of the social graph 200, content items retrieved, by a content gathering process, from the third-party system 170, e.g., web pages, geographic location information, and/or content items retrieved from other network-accessible services. The cached content 134 may also include content items retrieved from other sources, such as geographic location data from a GPS sensor of the client system 130, other information from other sensors of the client system 130, and the like. The cached content 134 is retrieved from one or more of these sources during times at which the source is available, e.g., while the client system 130 is online, the GPS sensor is able to detect a GPS satellite signal, or other radio or sensor is online or able to generate data. The content gathering process may be performed when, for example, the user is traveling and the device will soon go offline, and/or at other times. As an example, content gathering may be initiated at times that are based on the type and/or destination of the user's upcoming travel plans, historical data indicating that the device goes offline in particular situations, or at particular locations, such as locations on the user's planned travel route, an explicit request by the user to cache content for use offline, and so on. Content gathering may be initiated at other times, e.g., at periodic times and/or at times during which the client system 130 is idle or unused. Caching in advance, e.g., prefetching, may be performed when the user logs into social-network 160 or third-party system 170, or at some other time prior to a content composer application being executed. For example, information about locations passed by or visited by the device can be cached for possible future use.

In particular embodiments, different caching strategies can be used for different handsets or in different environments. In more constrained networks and/or on lower-end phones, less information may be downloaded and cached, so as not to fill the memory of the device. If a user does not post often, then the amount of cached information may be reduced. Similarly, if the user posts often and/or in situations when there is no network connection, then the amount of cached information may be increased.

In particular embodiments, the determination of whether to cache particular information may be based on current location data, such as the device's current location, direction of travel, speed of travel, altitude, and other location information, as provided by a GPS sensor or the like. In one example, information related to locations at or near the current area may be cached. If there is a known location at which network access is known to be weak (e.g., 5% or 10% of ordinary or average signal strength) or unavailable (e.g., zero signal strength, or strength too low to communicate with a cellular base station, wireless/WIFI access point, or other network element), and/or the user is about to enter such a location, such as a subway station, then content may be cached prior to the user's arrival at that location. The determination of whether network access is weak or unavailable may be based on according to a location database, historical signal availability data stored in the device or available from a network service, or other source of information. If the user is moving toward a location at which network access is known to be weak or unavailable, and/or the user is located near such a location, then location content related to that location may be identified and stored in the device's cache. The content related to that location may therefore be made accessible in the cache for use when the device is at or near the location and network access is not available. The device may be considered to be near a location when the distance between the device is less than a threshold value, such as 10 meters, 50 meters, 100 meters, 1 kilometer, or other appropriate distance. The distance may be measured between the device's location and another location in a vertical direction (e.g., to a point underground or above ground), as well as between horizontal latitude, longitude locations. The distance at which location is considered near may be proportional to the speed at which the user is moving. The content that is cached in this way may include content related to the location at which network access may be unavailable, and/or content related to the current location of the device, such as a subway station's map, subway train schedules, and information about nearby locations of interest.

In particular embodiments, the client system may maintain a location history that records the places visited by the device and the availability of network connectivity in those places. The location history may be used to determine what to cache. If the user 101 ordinarily has a network connection and can readily download information, then the quantity of cached information may be reduced. In one aspect, relatively small data objects that are likely to be used, such as privacy settings and other privacy-related information, may be cached and remain in the cache.

In particular embodiments, when a user travels outside the geographic region in which they live, which is also referred to herein as their "home town", and the user frequently posts or otherwise creates content when traveling outside their home town, then the amount of caching can be increased. Conversely, if the user is known to travel outside their home geographic region without often posting from outside their region, then the amount of caching can be reduced. If a traveling user's destination is known, then information about the destination may be stored in the cache storage 132. For example, if a person is on a flight from San Francisco to New York City, and posts "I am at SFO and traveling to JFK," then a prediction can be made that the user's location will be JFK airport in the near future. A user's future location may be predicted by analyzing information associated with the user, such as the user's posts, travel itineraries, meeting locations, and so on. For example, automated text analysis may recognize that the post "I am . . . traveling to JFK" indicates that the user is traveling and the destination is JFK airport, which is located near New York City. Therefore, JFK airport and New York City are predicted locations of the user. Information related to the predicted locations, such as hotspots near JFK airport and/or in New York City, may be cached before the user 101 leaves San Francisco or when connectivity is available during the trip. As another example, a user 101 may explicitly indicate their destination, e.g., by posting that they are traveling to a particular location such as JFK airport. Information about the destination may then be cached.

In particular embodiments, information about a location that is cached may include the location's name, an image showing the location, a unique identifier for the location, and/or the location's latitude and longitude coordinates. This core information is cached for offline use, whereas more information, e.g., more metadata, is available and may be downloaded when network connectivity becomes available. Ratings, more photos, and the like may be downloaded when the device is again online, but the identifying information and/or metadata may be downloaded for offline use. Information in the cache storage 132 that is less likely, or unlikely, to be used may be replaced by information that is more likely to be used. The oldest or least-recently used information in the cache may be evicted, e.g., deleted, when new information is to be cached. Although this disclosure describes gathering and storing particular content in the cache storage 132 in a particular manner, this disclosure contemplates gathering and storing any suitable data content in any suitable manner.

In particular embodiments, data to be cached may be identified and selected from information accessible to the user while the device 130 is online. In one aspect, the data to be stored in the cache storage 132 may be identified by identifying candidate content 136 from data sources 140, 170 that are accessible to the user 101, then selecting a subset of the candidate content 136 that is relevant to the user, as described below, and storing the selected candidate content in the cache storage 132 as the cache content 134. This identification and storage of cache content 134 may be performed, for example, when network communication is available to the client device 130, which may occur when a wireless network 110 is in range, when the client system 130 is connected another device that provides network connectivity, or in any other conditions under which the client system 130 has network connectivity. The candidate content 136, or metadata describing it, may be downloaded via the network 110 from servers 160, 170. If metadata is downloaded, the decision as to whether particular items of candidate content 136 associated with the metadata are to be cached may be made based on the metadata. If an item of candidate content 136 is to be cached, at least a portion of the candidate content item may be downloaded and stored in the cache storage 132. In particular embodiments, the portion of the candidate content 136 that is downloaded and stored in the cache 132 may include core information, e.g., a name of the content item, and a small number of attributes and/or media objects associated with the content item, such as a photograph, geographic location, or other information that represents the content item. Although this disclosure describes identifying and selecting particular data to be cached in a particular manner, this disclosure contemplates identifying and selecting any suitable data to be cached in any suitable manner.

In particular embodiments, the cache content 134 may include data that is presentable to a user 101 in a content-creation user interface on the client system 130 while the client system 130 is offline. The cache content 134 may be a condensed or reduced-size representation of core portions of the candidate content 136 that are selected for inclusion in the cache storage 132, such as an identifying name, a short test description (e.g., less than 1 kilobyte in length) an image such as a photograph, a data attribute associated with the selected candidate content, other attributes, media object(s), and/or descriptive information. In one aspect, the cache content 134 is a relatively minimal quantity of data that represents the selected candidate content. A user 101 may access the cache content 134 while the client system 130 is offline, and, when network communication becomes available, use that accessed cache content 134 to access further information about the content item(s) that are represented by the cache content 134. Although this disclosure describes caching particular portions of the candidate content 136 in a particular manner, this disclosure contemplates caching any suitable portions of the candidate content 136 in any suitable manner.

In particular embodiments, a set of candidate content items to be considered for possible inclusion in the cache storage 132 may be identified and retrieved from data sources such as a social graph 200 of social-networking system 160, third-party systems 170 such as web sites, databases, and other data sources accessible via the network 110. Although social graph information is used as a data source in examples presented herein, the data sources are not limited to the social graph. Other data sources, including but not limited to web sites, databases, web services, and the like, may be used to retrieve information related to the user. The candidate content items may be based on information related to one more current actions of the user, e.g., user actions that occur at or near the time at which the candidate content items are being identified. The candidate content items may also be based on the user's past actions and/or predicted actions, which may be determined by analyzing information associated with the user, such as travel plans, appointments, and the like. Although this disclosure describes identifying and retrieving particular candidate content items from data sources in a particular manner, this disclosure contemplates identifying and retrieving any suitable candidate data items in any suitable manner. The selection of candidate content items based on the social graph and/or other sources, and/or on current, past, and planned future actions, which may be represented by information in the social graph or other data sources, is described in more detail below.

In particular embodiments, the selection of the cache content 134 may be based on information in the social graph associated with a user node that represents the user. This information may include attributes of the user node, e.g., the user's name, location, home town, and so on. In one aspect, the cache content 130 may be selected from attributes of social graph nodes that are connected to the user's node by one or more edges. These nodes may, for example, represent the user's friends, entities the user likes, entities of interest to the user, places the user has visited, and so on. The cache content 134 may include entities associated by the user with one or more tags, entities referenced by content created by the user, or a combination thereof. The cache content may, in one example, include web pages accessed by the user, web pages referenced by content created by the user, or a combination thereof.

In one or more embodiments, entities that are mentioned or tagged by the user may be included in the cache content 134. For example, the user may mention friends in a composition, mention or tag pages that the user likes, or mention or tag other nodes on the graph. These entities, as well as entities that are trending or otherwise likely to be mentioned, may be downloaded to the client device 130 for storage as cached content 134. Liked pages may be identified using their entity name, or other associated information, such as a photo that represents a liked page. As another example, entities that are located near the user and are tagged or otherwise known as landmarks may be cached in the cache storage 132. For example, if the user is geographically located near Yankee Stadium, then the location of and other information about Yankee Stadium may be cached while the client system 130 has network connectivity. Information about entities related to the stadium, such as the Yankees baseball team, may also be cached. Verbs that are relevant to an entity at or near the user's location may also be cached. For example, since a user 101 is likely to be watching a game when they are at a stadium, the verb-noun pair "watching the Yankees" may be cached, since when the user goes into the stadium, they may not have connectivity to access information about watching the Yankees.

In particular embodiments, the cache content may include information related to one or more current actions of the user, which are also referred to herein as minutiae. This information may include posts made by the user, status updates indicating a state or action performed by the user, a current geographic location of the user, information about places near a the current geographic location of the user, and the like. The current actions may be identified based on minutiae information provided by the user, e.g., reading a book, watching television, listening to a radio station or song, expressions of the user's feelings, and so on. The name of a particular object associated with a minutiae expression may also be included in the current action, such as a name identifying a television show being watched, radio station or song being listened to, or feeling. In particular embodiments, the cache content 134 may include information related to one more past actions of the user. This information may include social network posts made by the user, messages sent or received by the user, web pages visited by the user, status updates describing a state or action of the user, and the like. Although this disclosure describes including particular information related to actions of a user in cache content 134 in a particular manner, this disclosure contemplates including any suitable information related to current actions of the user in the cache content 134 in any suitable manner.

In particular embodiments, the cache content 134 may include information about predicted actions of the user 101. The predicted actions may be identified from data sources such as user calendar information, travel itineraries, travel routes, places located on travel routes, posts that include travel plans, travel reservations, and the like. In particular embodiments, a predicted location of the user may be determined from the predicted actions, and information associated with locations at or near the predicted location may be included in the cache content. As an example, locations near other locations may be within a predetermined distance of the other locations, e.g., 50 feet, 100 feet, 500 feet, 1 mile, or other appropriate distance.

The cache content may include information about locations frequently visited by other users who have visited or are visiting the predicted location when the user is a visitor to that location. That is, information about places that are popular with other users may be included in the cache content 134. Such place information may be retrieved from the social graph 200, from the third-party system 170, or from another source of location data. The cache content 134 may also include information about locations frequently visited by users who live in or near the predicted location when the predicted location is in or near the user's home geographic location.

In particular embodiments, cache content to be stored in cache storage of the computing device may be selected from the candidate content. Selecting the cache content may be done by identifying candidate content items in the candidate content, determining relevance values for the candidate content items, and identifying selected cache content items from the candidate content items based on the one or more relevance values. The selected cache content items may be stored in the cache storage 132 as cached content 134. Relevance values for the candidate content items may be determined using "rules" or mathematical formulas that describe how to calculate a relevance value for each type of content, then applying the rules to the candidate content 136. The relevance values are thus analogous to feature values used in machine-learning models. The rules may determine the relevance values based on the candidate content 136 and the data associated with the user 101, such as attributes of the user's node in the social graph. The items of the candidate content 136 may be sorted by their relevance values, with a set of the most relevant items being included in the cache content 134 and stored in the cache storage 132. The number of items included in the cache content 134 may be determined implicitly based on the amount of available space in the cache storage 132 and the amount of space needed to store the items of cache content 134. For example, the items of candidate content 136 may be stored in the cache storage 132 starting with the candidate content item having highest relevance value, and storing each item in decreasing order of relevance value until a threshold amount of cache storage space has been used to store the items of selected candidate content 136. The threshold amount of cache storage space may be, for example, a percentage of the total size of the cache storage 132, a percentage of the amount of free space in the cache storage 132, or other appropriate number.

In other embodiments, the relevance values may be used in a machine-learning model to identify the items of the candidate content 136 that are most relevant to the user 101. For example, the relevance values may be used to generate feature vectors for items of candidate content 136 and for the user. The machine learning model may select the most relevant items of the candidate content 136 by selecting the feature vectors that are most similar to a feature vector of the user. Although this disclosure describes storing particular content in cache storage of the computing device in a particular manner, this disclosure contemplates storing any suitable content in any suitable manner.

In particular embodiments, the relevance values may be based on feature values that are determined for candidate content items using rules for each type of content. The relevance values may be used to determine whether to cache a candidate date item by calculating the relevance rule(s) that apply to that type of candidate data item. If more than one rule applies to a candidate data item, the feature values for the applicable types may be added together. In one aspect, greater feature values indicate that associated content data items are more likely to be used while the user is offline, and smaller feature values indicate that associated content data items are less likely to be used while the user is offline. Although this disclosure describes determining particular relevance values in a particular manner, this disclosure contemplates determining any suitable relevance values in any suitable manner. Example feature computation rules are described below.

In one example, a "current location" feature may be determined based on the device's current location. If there is a location at or near the device's current location where network access is known to be weak or unavailable, and/or the user is about to enter such a location, e.g., a subway station, then content related to that location should be cached, so that it is accessible if network access is not available at the location. The content that is cached in this way may include content describing or related to the location at which network communication may be unavailable, such as a name, address, short description, map, open hours, likes, reviews, and other content of potential use to a user at the location. In another example, a "future location" feature may be determined based on a location near the device's current location and the direction in which the device is moving. Content related to the future location may be cached, and future location feature values may be generated for locations near the device's current location and/or in the direction the device is moving. The future location feature value may be greater for locations that are located in the direction the device is moving than for other directions, and/or inversely proportional to a distance from the device's current location to the future location. For example, if the user is walking in a direction toward a subway station, then content related to the subway station should be cached, and the future location feature value for the subway station should be relatively high compared to the values for locations in other directions.

In one example, a "location on route" feature may be determined for a location-related content item based on the closest distance from the location to the user's planned route. The planned route may be determined from itinerary information maintained for the user. For example, the location on route feature value may be inversely proportional to the closest distance for a particular location-related content item, so that locations that are closer to the user's route are more likely to be cached.

In one example, a "location popularity" feature may be determined for a location-related content item that corresponds to a location outside the user's home town based on how frequently the location is visited by other people who do not live at or near the location. For example, the feature value may be calculated by dividing the average number of times per year that the location is visited by users who do not live at or near the location by the total number of times per year the location is visited by users regardless of where they live. As another example, the location popularity may be calculated for locations in the user's home town, which may occur when the user is on a return trip. For example, the feature value for a location in the user's home town may be calculated by dividing the average number of times per year that the location is visited by users who live in the user's home town by the total number of times per year the location is visited by users regardless of where they live.

In one example, a "friend" feature may be determined for a content item that represents a friend of the user. The friend feature may be based on a friend coefficient, which is based on a closeness measure of the closeness of the friend to the user as measured by, e.g., distance in the social graph, e.g., 1 for first-degree friends, 2 for second-degree friends, and so on. For example, the friend feature may be inversely proportional to the closeness of the friend, so that information about or related to closer friends is more likely to be cached than is information about more distant friends. The friend feature may also be based on a number of times the friend has been tagged, mentioned, or referenced by the user, e.g., the percentage of the user's tags, mentions, or references that identify the friend.

In particular embodiments, feature values may be calculated for the user based on the user's actions and other user-related information. In one aspect, greater feature values indicate that content is more likely to be used while the user is offline, and smaller feature values indicate that content is less likely to be used offline. These feature values may be added together to determine the quantity of data to cache. For example, the size of the cache may be proportional to the sum of these feature values. Examples of such feature values, which do not depend on particular content items, are described below.

In one example, a "post-frequency" feature may be determined based on a comparison of the frequency at which the user posts items (e.g., messages or updates) when outside their home town and the frequency at which the user posts when in their home town. The ratio of these, e.g., the frequency of posts made from outside the home town to the frequency of posts made from inside the home town, can be used as the "post-frequency" feature value.

In one example, a "bandwidth" feature may be determined based on the frequency of the user being connected via high-bandwidth connection while traveling. For example, if the user is connected via high-bandwidth connections 75% of the user's total connection time on past trips, the bandwidth feature may be set to 0.75.

In one example, a "connectivity" feature may be determined based on information about the route to the user's current destination when the user is traveling. For example, if network connectivity is available at 50% of the different locations along the user's route according to an itinerary and a database of connectivity information, then the connectivity feature may be set to 0.5. Although this disclosure describes calculating particular feature values for users in a particular manner, this disclosure contemplates calculating any suitable feature values for users in any suitable manner.

In particular embodiments, the client system 130 may receive a request from the user 101 for a desired content item when network communication is not available on the device. A response that includes the desired content item may be generated by identifying a storage location in the cache storage at which the desired content item is stored, and retrieving the desired content item from the identified storage location. The desired content item may then be presented to the user, e.g., in a post or message composition user interface.

In particular embodiments, the client system 130 may receive updated content when a network connection becomes available to the client device after the device has been offline. The cache content 134 may be updated based on the received updated content. Information may be available on the client system that is more recent that the corresponding information in the cache content 134. As an example, the client system 130 may have recent location information, such as the device's latitude and longitude, that is more up to date than location information stored in the cache. This situation may occur, for example, if location information that includes the device's latitude and longitude is stored in the cache content 134 when a user exits a subway station, and the user goes to another location such as a stadium, in which the connectivity is poor. The device's internal value for the latitude and longitude (e.g., maintained by a location services subsystem and stored in the memory 104) may have been updated at some point between the subway station and the stadium, e.g., if a network connection became available or a GPS receiver was used to determine the device's location at a point between the subway station and the stadium.

Figure 3A:
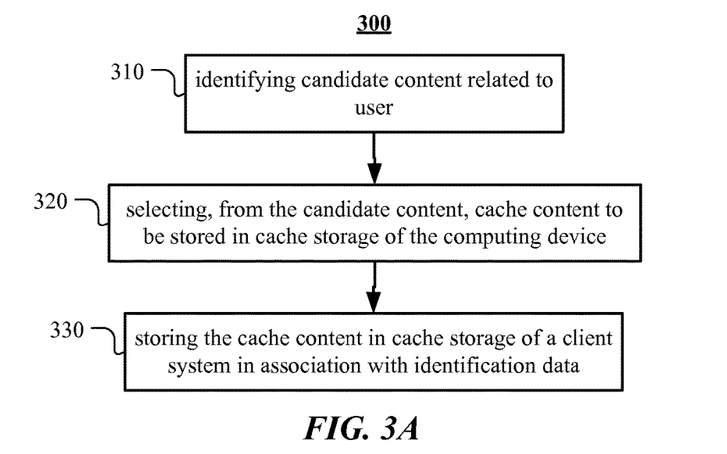
FIG. 3A illustrates an example method for identifying and storing content in a cache on a client device.

FIG. 3A illustrates an example method 300 for identifying and storing content in a cache on a client device. The method may begin at step 310, where candidate content related to the user is identified. The candidate content may be, for example, any content accessible to the user. As another example, the candidate content may be content related to the user, e.g., content represented by social graph nodes that are connected to or indirectly reachable from the user's node. At step 320, content to be cached is selected from the candidate content. At step 330, the cache content is stored in cache storage of the client system in association with identification data that may be used to retrieve specific items of the cache content. Particular embodiments may repeat one or more steps of the method of FIG. 3A, where appropriate. Although this disclosure describes and illustrates particular steps of the method of FIG. 3A as occurring in a particular order, this disclosure contemplates any suitable steps of the method of FIG. 3A occurring in any suitable order. Moreover, although this disclosure describes and illustrates an example method for identifying and storing content in a cache including the particular steps of the method of FIG. 3A, this disclosure contemplates any suitable method for identifying and storing content in a cache on a client device including any suitable steps, which may include all, some, or none of the steps of the method of FIG. 3A, where appropriate. Furthermore, although this disclosure describes and illustrates particular components, devices, or systems carrying out particular steps of the method of FIG. 3A, this disclosure contemplates any suitable combination of any suitable components, devices, or systems carrying out any suitable steps of the method of FIG. 3A.

Figure 3B:
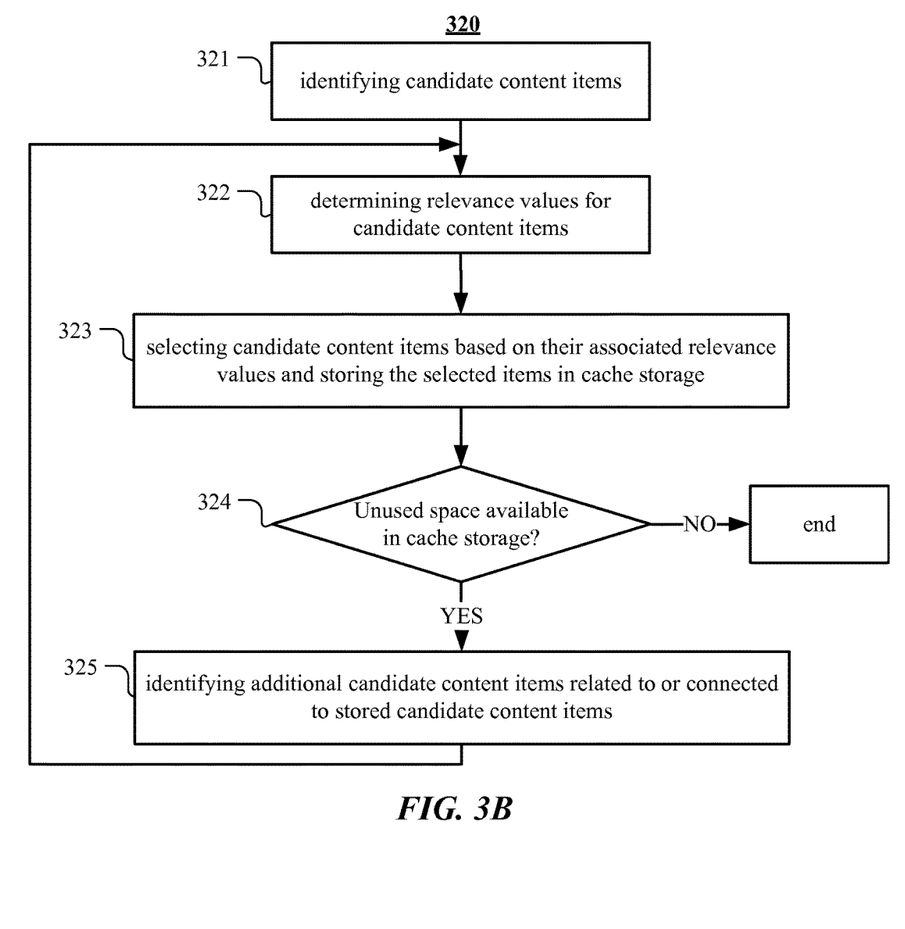
FIG. 3B illustrates an example method for selecting cache content to be stored in cache storage of the computing device.

FIG. 3B illustrates an example method 320 for selecting cache content to be stored in cache storage of the computing device. The method may begin at step 321, where one or more candidate content items are identified from the candidate content 136. At step 322, relevance values for the candidate content items are determined. At step 323, candidate content items are selected based on their associated relevance values, and the selected candidate content items are stored in the cache storage 132 as cached content 134. Step 323 may select a quantity of candidate content items such that the amount of cache storage 132 needed to store the selected quantity of items is less than the amount of unused space in the cache storage 132, or less than a threshold value, such as 80% or 90% of the unused space. At step 324, a determination is made as to whether unused space is available in the cache storage 132 after storing the items in the previous step. As an example, the amount of unused storage may be the amount of unused space prior to storing the items in the previous step minus the size of the items stored in the previous step. If there is insufficient space available to store content items, the method ends.

In particular embodiments, step 325 may attempt to identify additional candidate content items. If there is unused space available in the cache storage 132, then step 325 identifies additional candidate content items, which may include candidate content items that were not identified when step 323 was previously executed. These additional candidate content items may include content items connected to items considered at step 323 by an edge. That is, step 325 may expand the scope of content items being considered by a distance of one edge. Each subsequent iteration of the method that invoke step 325 may expand the scope by an additional distance of one edge. In other embodiments, step 325 may identify additional candidate content items that are relevant to the candidate content items selected at step 323. Step 325 transfers control to step 322, which identifies relevance values for the candidate content items. The candidate content items may be updated to include additional candidate content items identified at step 325. If step 325 does not find any additional candidate content items, or if step 325 is omitted, the method may proceed to step 322. If there is unused space available in the cache storage 132, more of the candidate content items may be selected for storage in the cache 132 at step 323. The method may continue in this way until block 324 determines that there is insufficient space available in the cache storage to store further content, at which point the method ends.

Particular embodiments may repeat one or more steps of the method of FIG. 3B, where appropriate. Although this disclosure describes and illustrates particular steps of the method of FIG. 3B as occurring in a particular order, this disclosure contemplates any suitable steps of the method of FIG. 3B occurring in any suitable order. Moreover, although this disclosure describes and illustrates an example method for selecting cache content to be stored in cache storage of the computing device including the particular steps of the method of FIG. 3B, this disclosure contemplates any suitable method for selecting cache content to be stored in cache storage of the computing device including any suitable steps, which may include all, some, or none of the steps of the method of FIG. 3B, where appropriate. Furthermore, although this disclosure describes and illustrates particular components, devices, or systems carrying out particular steps of the method of FIG. 3B, this disclosure contemplates any suitable combination of any suitable components, devices, or systems carrying out any suitable steps of the method of FIG. 3B.

Figure 4:
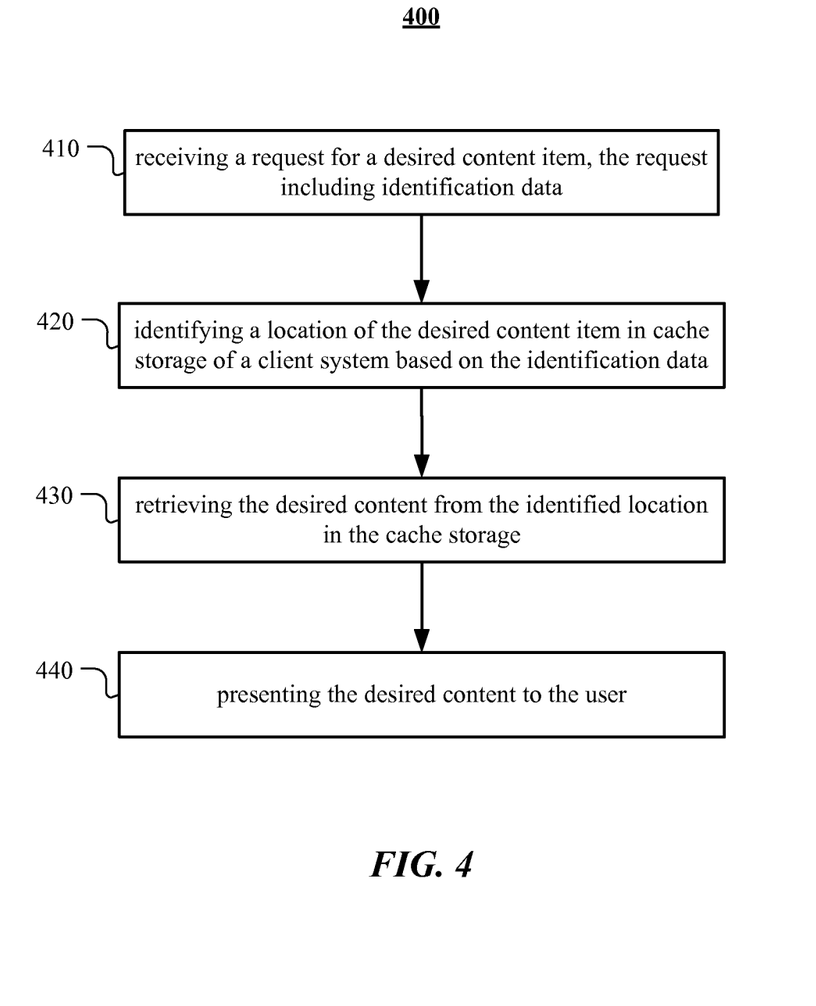
FIG. 4 illustrates an example method for retrieving content data from cache storage

FIG. 4 illustrates an example method 400 for retrieving content data from cache storage 132. The method may begin at step 410, where a request for a desired content item is received. The request may include identification data, such as a numeric identifier, name, and/or keyword(s) for the content data item being requested. At step 420, a location of the desired content item in cache storage 132 of a client system is identified based on the identification data. Step 420 may determine the location using an index lookup or other mapping operation, as described above. At step 430, the desired content is retrieved from the identified memory location in the cache storage 132. At step 440, the desired content is presented to the user, e.g., in a content creation user interface of a web browser or application, or other appropriate user interface. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for retrieving content data from the cache storage including the particular steps of the method of FIG. 4, this disclosure contemplates any suitable method for retrieving content data from the cache storage including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
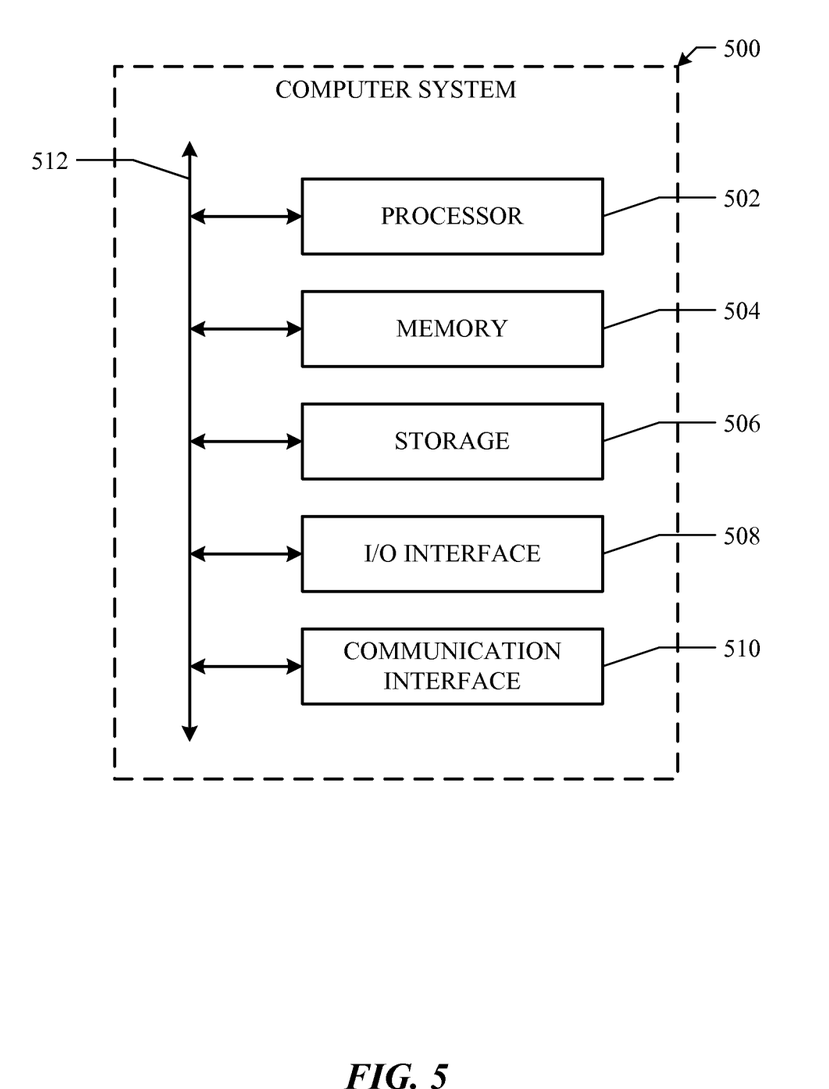
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, identifying candidate content associated with a user of the computing device;
   by the computing device, identifying one or more predicted actions of the user based on one or more data sources, the data sources comprising at least calendar information or one or more travel itineraries;

by the computing device, determining, based on the predicted actions, a predicted location of the user;
by the computing device, predicting that the computing device will not have network connectivity at the predicted location, wherein the predicting is based at least in part on a location history that records one or more places visited by the computing device and an availability of network connectivity associated with each of the places;
by the computing device, determining an amount of content to cache based at least in part on a predicted frequency that the user post to a social-networking system at the predicted location;
by the computing device, selecting, from the candidate content, the determined amount of cache content to be stored in cache storage of the computing device for access by the user when the computing device does not have network connectivity, wherein the cache content comprises:
 information associated with one or more locations at or near the predicted location of the user, and
 one or more attributes of one or more nodes that are connected to a user node that represents the user in a social graph by one or more edges, the one or more attributes being accessible by the computing device for one or more applications; and
by the computing device, storing the cache content in the cache storage of the computing device.

2. The method of claim 1, wherein the cache content comprises a name that identifies the candidate content.

3. The method of claim 2, wherein the cache content comprises:
 a description of the candidate content;
 an image that represents the candidate content; or
 a data attribute associated with the candidate content.

4. The method of claim 1, wherein the cache content is based on information associated with a user node that represents the user in a social graph.

5. The method of claim 4, wherein the cache content is selected from:
 one or more attributes of the user node.

6. The method of claim 4, wherein the cache content comprises:
 entities liked by the user;
 friends of the user; or
 entities of interest to the user.

7. The method of claim 4, wherein the cache content comprises:
 entities associated by the user with one or more tags; or
 entities referenced by content created by the user.

8. The method of claim 4, wherein the cache content comprises:
 web pages accessed by the user; or
 web pages referenced by content created by the user.

9. The method of claim 4, wherein:
 the cache content comprises information related to one or more current actions of the user; and the information comprises:
  posts made by the user;
  status updates made by the user;
  a current geographic location of the user; or
  information about places near the current geographic location of the user.

10. The method of claim 1, wherein the cache content is based on information related to one or more past actions of the user.

11. The method of claim 10, wherein the information related to one or more past actions of the user comprises:
 social-network posts by the user;
 messages sent or received by the user;
 web pages visited by the user; or
 status updates describing a state or action of the user.

12. The method of claim 1, wherein the one or more predicted actions of the user are based on:
 one or more travel routes;
 one or more places located on one or more travel routes;
 one or more travel plans; or
 one or more travel reservations.

13. The method of claim 1, wherein, when the predicted location is located outside the user's home town, the cache content comprises information about locations near the predicted location that are frequently visited by other users whose home towns are not near the predicted location.

14. The method of claim 1, wherein selecting the cache content from the candidate content comprises:
 identifying one or more candidate content items from the candidate content;
 determining one or more relevance values for the one or more candidate content items; and
 identifying one or more selected content items from the one or more candidate content items based on the one or more relevance values, wherein the cache content comprises the one or more selected content items.

15. The method of claim 1, further comprising:
 receiving a request from the user for a desired content item when network communication is not available on the device;
 identifying a storage location in the cache storage at which the desired content item is stored;
 retrieving the desired content item from the identified storage location; and
 presenting, to the user, the desired content item.

16. The method of claim 1, further comprising downloading the cache content from a server when the computing device has network connectivity and the computing device is located near a location at which network connectivity is weak or unavailable.

17. One or more computer-readable non-transitory storage media embodying software that is operable when executed to:
 identify candidate content associated with a user of a computing device;
 identify one or more predicted actions of the user based on one or more data sources, the data sources comprising at least calendar information or one or more travel itineraries;
 determine, based on the predicted actions, a predicted location of the user;
 predict that the computing device will not have network connectivity at the predicted location, wherein the predicting is based at least in part on a location history that records one or more places visited by the computing device and an availability of network connectivity associated with each of the places;
 determine an amount of content to cache based at least in part on a predicted frequency that the user post to a social-networking system at the predicted location;
 select, from the candidate content, the determined amount of cache content to be stored in cache storage of the computing device for access by the user when the computing device does not have network connectivity, wherein the cache content comprises:

information associated with one or more locations at or near the predicted location of the user, and one or more attributes of one or more nodes that are connected to a user node that represents the user in a social graph by one or more edges, the one or more attributes being accessible by the computing device for one or more applications; and store the cache content in the cache storage of the computing device.

18. A system comprising:

one or more processors; and a memory coupled to the processors comprising instructions executable by the processors, the processors being operable when executing the instructions to:

identify candidate content associated with a user of a computing device;

identify one or more predicted actions of the user based on one or more data sources, the data sources comprising at least calendar information or one or more travel itineraries;

determine, based on the predicted actions, a predicted location of the user;

predict that the computing device will not have network connectivity at the predicted location, wherein the predicting is based at least in part on a location history that records one or more places visited by the computing device and an availability of network connectivity associated with each of the places;

determine an amount of content to cache based at least in part on a predicted frequency that the user post to a social-networking system at the predicted location;

select, from the candidate content, the determined amount of cache content to be stored in cache storage of the computing device for access by the user when the computing device does not have network connectivity, wherein the cache content comprises:

information associated with one or more locations at or near the predicted location of the user, and one or more attributes of one or more nodes that are connected to a user node that represents the user in a social graph by one or more edges, the one or more attributes being accessible by the computing device for one or more applications; and store the cache content in the cache storage of the computing device.

* * * * *